(12) United States Patent
Hashimoto et al.

(10) Patent No.: US 6,382,341 B1
(45) Date of Patent: May 7, 2002

(54) SUPPORT APPARATUS FOR VEHICLE DRIVE UNIT

(75) Inventors: Takashi Hashimoto, Yokosuka; Keijiro Iwao, Yokohama, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/656,171

(22) Filed: Sep. 6, 2000

(30) Foreign Application Priority Data

Sep. 10, 1999 (JP) ........................................... 11-256611

(51) Int. Cl.$^7$ ............................................... B62D 21/00
(52) U.S. Cl. ....................................................... 180/312
(58) Field of Search .................................. 280/781, 785; 180/311, 312, 374, 377, 378, 291, 292, 295, 299

(56) References Cited

U.S. PATENT DOCUMENTS

| | | | | |
|---|---|---|---|---|
| 3,825,090 A | * | 7/1974 | Runkle et al. | 180/292 |
| 4,632,211 A | * | 12/1986 | Le Salver et al. | 180/312 |
| 4,643,270 A | * | 2/1987 | Beer | 180/299 |
| 5,454,443 A | * | 10/1995 | Fischle et al. | 180/312 |

FOREIGN PATENT DOCUMENTS

| | | | | |
|---|---|---|---|---|
| JP | 406001151 A | * | 1/1994 | 180/312 |
| JP | 8-132900 A | | 5/1996 | |
| JP | 10-58996 A | | 3/1998 | |
| JP | 10-184379 A | | 7/1998 | |
| JP | 11-6736 A | | 1/1999 | |

* cited by examiner

Primary Examiner—Brian L. Johnson
Assistant Examiner—Faye M. Fleming
(74) Attorney, Agent, or Firm—Shinjyu Global IP Counselors, LLP (57) ABSTRACT

A vehicle drive unit with a support apparatus is provided which can provide both low rigidity in the translational direction at the center of gravity and high rigidity with respect to moment input caused by the drive shaft at the center of gravity. The low rigidity in the translational direction at the center of gravity provided by the support apparatus is required for vibration control. The high rigidity in the translational direction at the center of gravity provided by the support apparatus is required for controlling the jerking vibration that occurs during acceleration from a standstill. The support apparatus is preferably designed to support a drive unit with an integrated reduction gear. The support apparatus has multiple elastic mounting members in a vehicle for which at least the front wheels or the rear wheels are driven by an electric motor or the like. Preferably, the elastic mounting members that support the drive unit are at least three in number and arranged within the same plane. The elastic centers of the elastic mounting members are set so as to be contained within one plane. This plane is set so that when it is used as the mounting plane, two of the inertial axes of the drive unit lie within the mounting plane.

10 Claims, 11 Drawing Sheets

SUPPORT APPARATUS FOR VEHICLE DRIVE UNIT

BACKGROUND OF THE INVENTION

1. Field of the Invention

This invention generally relates to a support apparatus for a vehicle drive unit. More specifically, the present invention relates to a support apparatus that is especially useful for a vehicle drive unit of hybrid cars and electric cars.

2. Background Information

Vehicle drive units are supported in a variety of ways on a vehicle. Some drive units are supported on a sub-frame of the vehicle by a support apparatus, while some drive units are mounted directly to the body of the vehicle. With regard to a support apparatus for a rear differential unit, the rear differential unit has conventionally been supported to a body of a vehicle via a sub frame or suspension member to reduce pitching vibration from being transmitted to the body of the vehicle. A rear differential unit is a gear system that is typically employed in a rear-wheel drive vehicle. The rear differential transfers power from a drive or propeller shaft to output axle shafts, which are splined to a differential case at a right angle. When a drive shaft vibrates as the vehicle accelerates, the rear differential unit is subjected to a pitching vibration, which is a rotational vibration on the front and rear sides of the vehicle about a center of the gravity.

Alternatively, there have been known support structures for rear differential units, such as the one described in Japanese Laid-Open Patent Publication H08-132900, which do not utilize a sub-frame. In this publication, a rear differential unit is supported by front and rear cross members, which are mounted directly to a floor panel. In this structure, the rear differential unit is supported by the front cross member at a front support point, and by the rear cross member at two points, rear support points. These points are positioned such that the pitching vibration will be canceled on front and rear sides of the axle center due to an overlap of resonant vibrations having different phases. In other words, where the distance between the axle centerline and the front support point is L1, and the distance between the axle centerline and the rear support points along a rear drive shaft is L2, a ratio of the distance L1 to the distance L2 is 2:1. Due to different phases of the resonant vibrations, this ratio allows the pitching vibrations transmitted to rear differential unit to cancel each other on front and rear sides of the axle centerline. Accordingly, since pitching resonance transmitted to the rear differential unit will be phase-canceled, the pitching will not typically be transmitted to the body of the vehicle.

Since the conventional sub-frame can be eliminated with this structure, the weight and cost of the vehicle can be reduced. Also, the floor can be lowered without having to increase vibrations and noises transmitted to the interior of the vehicle.

However, such conventional support structure for a rear differential unit does not go beyond establishing a ratio between dimensions of the front and rear portions of the rear drive shaft as divided by the axle centerline. In other words, this structure is only effective in a two-shafts structure, where the input and output shafts are in a crosswise arrangement and torque is inputted from one of the shafts and outputted to the other, as is the case in a rear differential unit. Thus, this vibration suppression method cannot be used in a single shaft arrangement.

Moreover, when this conventional structure is applied to a drive unit utilizing an electric motor, instead of a rear differential unit, this vibration suppression does not function. A drive unit for an electric vehicle includes a motor, a reduction gear and a differential unit. Since drive units are well known in the art, the structure and function of a drive unit would be obvious to one of ordinary skill in the art without further explanation herein.

Since there is only an output shaft, instead of two shafts, in a drive unit, the suppression of pitching vibration by way of phase-cancellation of pitching resonance is not effective. Therefore, the conventional support structure is not sufficiently effective in a single drive shaft. In other words, the phase-canceling effect obtained in a 2-shafts structure, which reduces pitching vibrations, can not be obtained in a single shaft structure.

Furthermore, a drive unit for a hybrid or electric car includes electric motors. The vehicle drive unit includes a reduction gear when one is provided. Hybrid vehicles are vehicles that run on both electrical energy and mechanical energy, while electric cars run on electrical energy. Typically, the electric motors are operatively connected to driving wheels through a power transmission mechanism of the vehicle. While the vehicle is running, the electric motor normally drives the vehicle as power is supplied from a battery. When the vehicle is in a decelerating operation, the electric motor functions as an electric generator to generate deceleration recovery power, with which the battery is charged. In other words, in a hybrid car, the electric motors are also source of torque. Therefore, it is difficult to reduce vibrations with a conventional support structure.

Besides, when a vehicle is operated by motors, the motors create a large torque and a high rotational moment about the drive shaft at a low rotational speed. Accordingly, it is preferable that the rotational rigidity of the support apparatus be high. However, if the translational rigidity is too low, too much vibration will be transmitted to the vehicle body.

Due to the reasons set forth above, the conventional support structure does not provide sufficient vibration suppression function to be employed in a drive unit for a hybrid or electric car. Conventional support structures particularly cannot reduce vibrations with small displacements, such as jerking vibrations resulting from reaction forces to driving force that occurs when the vehicle starts moving.

In view of the above, there exists a need for a support apparatus for a vehicle drive unit which overcomes the above mentioned problems in the prior art. This invention addresses this need in the prior art as well as other needs, which will become apparent to those skilled in the art from this disclosure.

SUMMARY OF THE INVENTION

The object of the present invention is to provide a support apparatus for drive unit having an electric motor, for use in a hybrid vehicle and/or electric car. The support apparatus of the present invention provides low rigidity in the translational direction and high rigidity against moment inputted by the drive shaft at the center of gravity. In this manner the support apparatus can both reduce vibration due to the low rigidity in the translational direction, and reduce jerking vibration at the start-up of the vehicle due to the high rigidity against moment transmitted from the drive shaft.

The foregoing objects can basically be attained by providing a support apparatus for a vehicle drive unit. The vehicle drive unit has a center of gravity with an inertial coordinate system defined by three inertial axes orthogonally intersecting at a single point that coincides with the center of gravity. The support apparatus comprises a vehicle support member and at least three elastic mounting members coupled to the vehicle support member with individual elastic centers of the elastic mounting members lying within a mounting plane. The elastic mounting members define an entire elastic support system having an elastic coordinate system with three elastic axes orthogonally intersecting at a single point. The single intersection point coincides with an overall elastic center of the elastic mounting members. The elastic mounting members are further dimensioned and arranged on the vehicle support member so that the elastic mounting members are adapted to support two of the inertial axes of the drive unit within the mounting plane of the elastic mounting members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

As seen in the Figures, four preferred embodiments are illustrated by way of examples to show how to carry out the present invention. Prior to describing the preferred embodiments of the present invention, a brief description of the underlying concepts of the present invention will be described in order to provide a basis for a better understanding of the present invention.

The term "elastic principal axes" as used herein refers to the axes of a composite coordinate axis system that is inherently formed by a group of three or more elastic mounting members. The elastic principal axes of the composite coordinate axis system can be defined as axes for which the load is applied to the group of elastic members in a direction of an elastic axis, the group of elastic members deforms only in the direction of the load. There are three elastic principal axes in a group of elastic members. The elastic principal axes intersect orthogonally at a single point. An elastic center is defined as the intersection point of the three orthogonally intersecting principal axes. Furthermore, inertial principal axes are axes that are inherent in a rigid body, and can be defined as follows; when the rigid body rotates about an inertial principal axis, no moment will be generated to change an angle of the rotational axis relative to a coordinate system that rotates with the drive unit. There are three inertial principal axes that intersect orthogonally at a single point. A center of gravity is defined as the intersection point of the three orthogonally intersecting principal axes.

Generally, when a force along one of the elastic principal axes acts against an elastically supported rigid body, the rigid body is displaced in a translational direction, but not in an angular direction. Meanwhile, when a couple acts on the elastically supported rigid body, the rigid body will experience angular displacement about an axis passing through the elastic center. Additionally, when the elastic center and the center of gravity are in the same mounting plane, the elastically supported rigid body will undergo a translational displacement in the direction of an elastic principal axis when a linear force acts on the rigid body. There will be no couple component in the displacement because the vector sum of the spring reactions at each support point will lie on the same elastic principal axis. Meanwhile, when a couple acts on the elastically supported rigid body, the direction of the couple will be perpendicular to the mounting plane. Thus, the direction of the couple and the direction of the rotation caused by the couple will coincide, and a rotational axis of the rotation will pass through the elastic center.

First Embodiment

Figure 1:
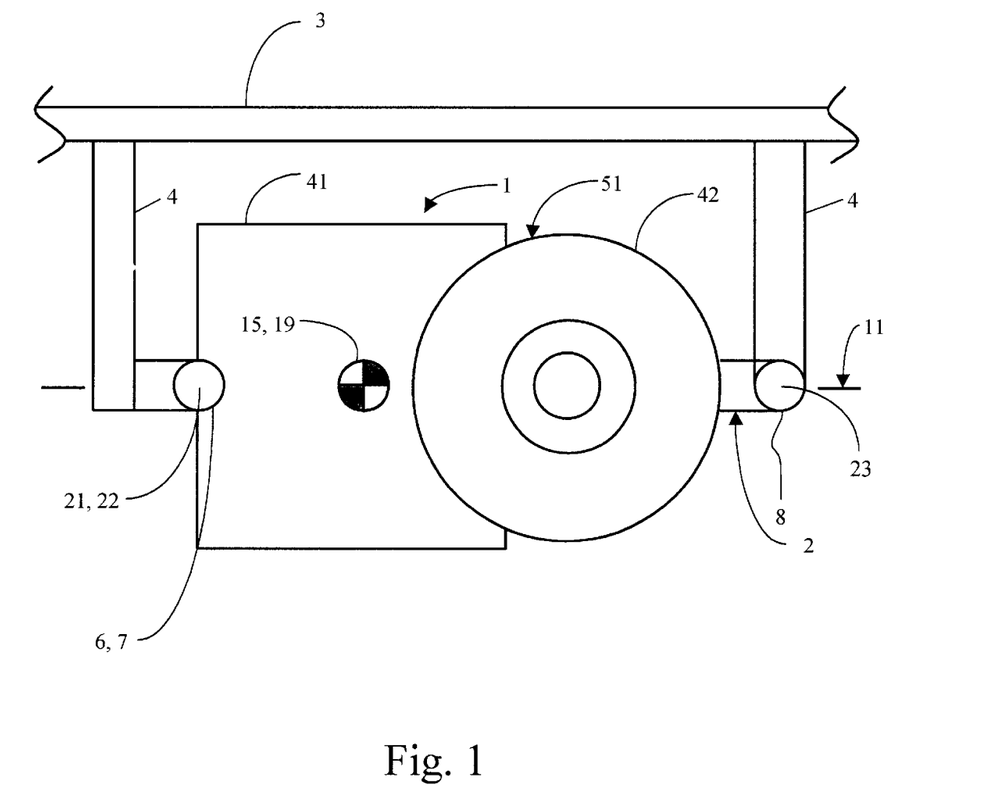
FIG. 1 is a schematic side elevational view illustrating a vehicle drive unit being supported at three support points by a support apparatus in accordance with a first embodiment of the present invention.
Figure 2:
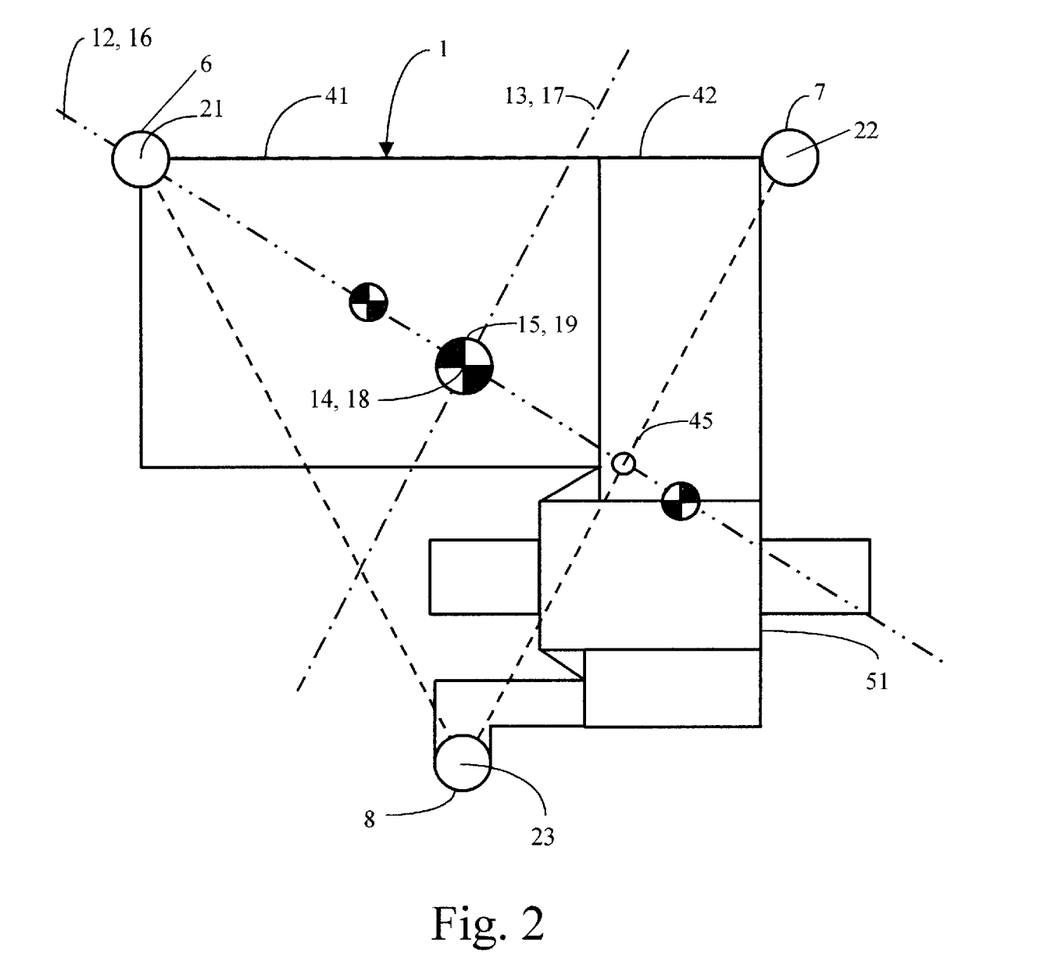
FIG. 2 is a schematic top plan view illustrating the vehicle drive unit being supported at three support points by the support apparatus illustrated in FIG. 1 in accordance with the first embodiment of the present invention.

Referring to FIGS. 1–4, schematic/analytical views of a vehicle drive unit 1 are illustrated with the drive unit 1 being supported by a support apparatus 2 to a floor panel 3 of a vehicle body at three elastic suspension or support points 21, 22 and 23 in accordance with a first embodiment of the present invention. As seen in FIGS. 1 and 2, the support apparatus 2 supports a supporting a drive unit 1 on suspension or support points 21, 22 and 23, which lie in the same mounting plane 11. The drive unit 1 is supported on a plurality of vehicle support members 4 coupled to the floor panel 3 of the vehicle. The vehicle support members 4 can be any type of framing support. For example, the vehicle support members 4 can be cross members formed with or on the floor panel 3 of the vehicle or a sub-frame that is coupled to the floor panel 3 of the vehicle.

Figure 3:
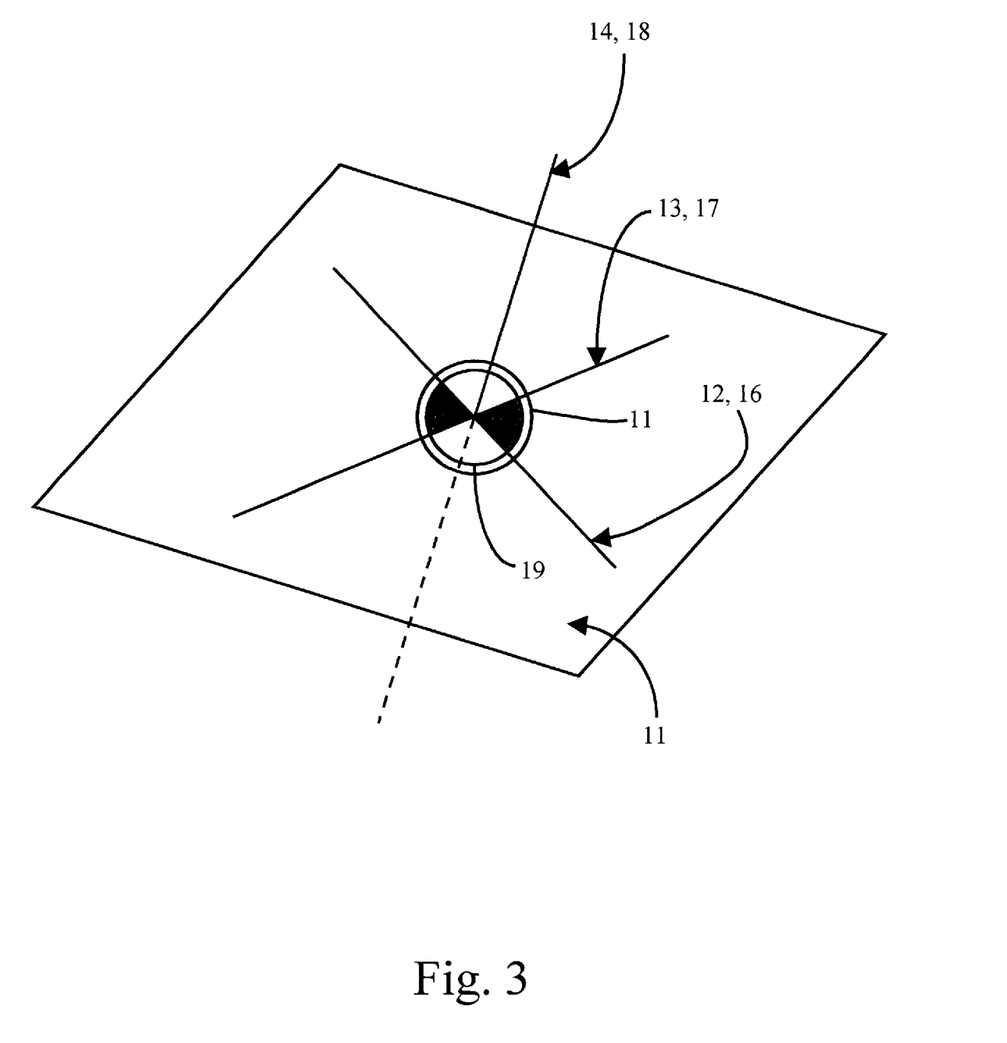
FIG. 3 is a perspective analytical diagram of the inertial axes, the elastic axes and the mounting plane for the vehicle drive unit and the support apparatus illustrated in FIGS. 1 and 2 in accordance with the first embodiment of the present invention.

Referring to FIGS. 1 and 2, the drive unit 1 includes an electric motor 41, a reduction gear 42 and a differential unit 51. Since drive units are well known, further explanation of the drive unit 1 will be omitted herein. Accordingly, the drive unit 1 will only be briefly described herein such that one of ordinary skill in the art can understand the construction of the drive unit 1 to be employed in the present invention from this description. The drive unit 1 has an overall inertial coordinate system defined by three orthogonally arranged inertial principal axes 12, 13 and 14 that intersect at a single point 15 as seen in FIG. 3. The single point 15 is the overall inertial center of the drive unit 1. The drive unit 1 has its overall center of gravity coinciding with the inertial center at point 15.

Referring to FIGS. 1 and 2, the drive unit 1 includes an electric motor 41, a reduction gear 42 and a differential unit 51. Since drive units are well known, further explanation of the drive unit 1 will be omitted herein. Accordingly, the drive unit 1 will only be briefly described herein such that one of ordinary skill in the art can understand the construction of the drive unit 1 to be employed in the present invention from this description. The drive unit 1 has an overall inertial coordinate system defined by three orthogonally arranged inertial axes 12, 13 and 14 that intersect at a single point 15 as seen in FIG. 3. The single point 15 is the overall inertial center of the drive unit 1. The drive unit 1 has its overall center of gravity coinciding with the inertial center at point 15.

The elastic mounting members 6, 7 and 8 define an entire elastic support system for the drive unit 1. This elastic support system of the elastic mounting members 6, 7 and 8 has an overall elastic coordinate system with three orthogonally arranged elastic principal axes 16, 17 and 18 that intersect at a single point (elastic center) 19. This single point 19 is the overall elastic center of the entire elastic support system defined by the elastic mounting members 6, 7 and 8.

In this embodiment, the inertial principal axes 12, 13 and 14 of the drive unit 1 substantially coincide with the elastic principal axes 16, 17 and 18 of the support apparatus 2. Thus, the overall elastic center 19 of the elastic support system substantially coincides with the overall center of gravity 15 that in turn substantially coincides with the inertial center at point 15. Also the inertial principal axes 12 and 13 of the drive unit 1 and elastic principal axes 16 and 17 of the elastic support system for the support apparatus 2 are on the same mounting plane 11 as seen in FIG. 3.

FIG. 3 is an analytical diagram of the inertial axes 12, 13 and 14 of the drive unit 1 and the elastic axes 16, 17 and 18 of the support apparatus 2. The arrangement of the support points 21, 22 and 23 shown in FIG. 1 will now be explained with reference to FIG. 3. The support apparatus 2 supports the drive unit 1 at a plurality of support points 21, 22 and 23 which is on the same mounting plane 11. While the number of the support points is illustrated as three, it will be apparent to those skilled in the art from this disclosure that more than three support points can be used to carry out this invention. In accordance with the support apparatus 2 of this embodiment, the drive unit 1 is supported such that two of the three inertial axes 12, 13, 14 of the drive unit 1 are contained within the mounting plane 11. Thus, as shown in FIGS. 1 and 2, the center of gravity 15 of the drive unit 1 is inevitably positioned on the single mounting plane 11. The vertical positions of the support points 21, 22 and 23 can be any configuration.

On the other hand, the support apparatus 2 has three elastic axes 16, 17 and 18 defined by the plurality of elastic mounting members 6, 7 and 8. Since all of the support points 21, 22 and 23 are on the same mounting plane 11, two of the elastic axes 16 and 17 also lie on the same mounting plane 11.

Accordingly, the elastic center 19 and the center of gravity 15 are both substantially located on the mounting plane 11. Since the drive unit 1 should be displaced in a translational direction upon receiving a linear force, and in angular direction upon receiving a couple of forces, any combination of linear force and a couple of forces can be resolved into translational and angular displacements. Therefore, moments acting on the drive unit 1 can be resolved into a component within the mounting plane 11 and a component normal to the mounting plane 11. Accordingly, in designing the elastic mounting members 6, 7 and 8 that will bear the forces acting on the drive unit 1, the rigidity in a direction parallel to the mounting plane 11 and the rigidity in the direction normal to the plane can be separated. More specifically, the rigidity in directions within the mounting plane 11 can be set at a low value to have a low translational rigidity in the support apparatus 2. Conversely, the rigidity in a direction perpendicular to the mounting plane 11 can be set at a high value to have a high rotational rigidity in the support apparatus 2. Accordingly, it is possible to set rotational characteristic values such as rolling rigidity at a high value.

In this first embodiment, the first and second inertial axes 12 and 13 of the drive unit 1 and the first and second elastic axes 16 and 17 of the support apparatus 2 substantially coincide. Accordingly, the intersecting point or center of gravity 15 of three inertial axes 12, 13 and 14 is the same as the intersecting point or elastic center 19 of three elastic axes 16, 17 and 18.

Figure 4:
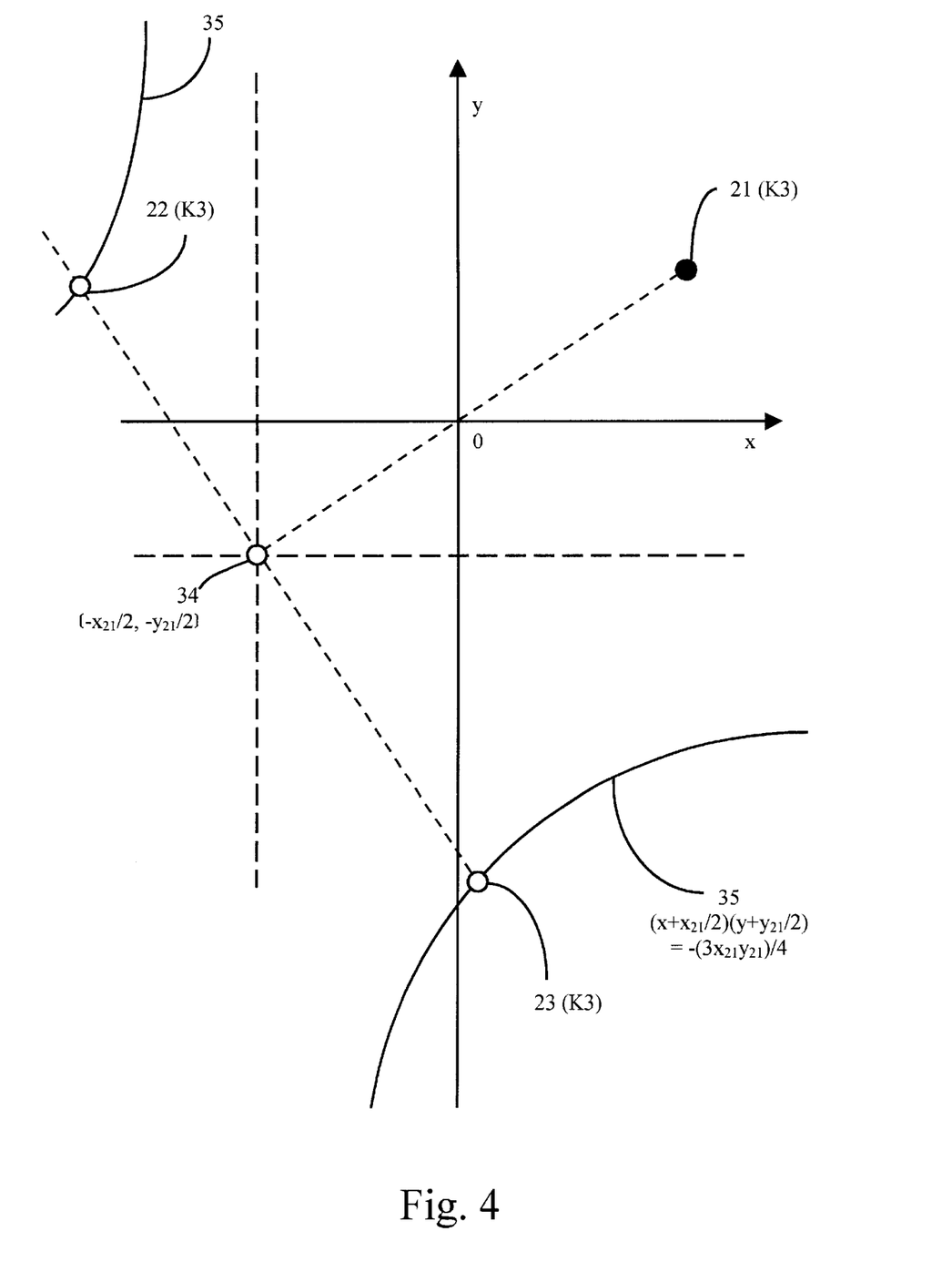
FIG. 4 is an analytical diagram of the support points as viewed along the vertical axis of the inertial axes and the elastic axes and arranged on the x-y plane to show the arrangement conditions of support points in accordance with the first embodiment of the present invention.

FIG. 4 is a plan view of the x-y plane that shows an arrangement of the support points, at which the support apparatus 2 supports the drive unit via elastic mounting members. In this embodiment, the number of support points is n, which is at least three. Referring to FIG. 4, first and second inertial axes 12 and 13 of the drive unit 1 and first and second elastic axes 16 and 17 of the support apparatus 2 coincide with the x and y coordinate axes, respectively. As an example, FIG. 4 shows an arrangement wherein the support points are located at three points 21, 22 and 23. The elastic constants in the z-direction, which is a vertical direction relative to the vehicle, are the same for all of support points.

Still referring to FIG. 4, a first support point 21 is at (x21, y21, z21). A second support point 22 is at (x22, y22, z22). A third support point 23 is at (x23, y23, z23). In this embodiment, since the x and y coordinate axes are the first and second elastic axes 16 and 17, the z-coordinate of each of the support point should be the same. In other words, z21=z22=z23=A, where A is a constant. The elastic constant in the z-direction, which is the vertical direction relative to the vehicle, at all of the support point 21–23 is k3. For two of the elastic axes formed by support points 21, 22 and 23 to coincide with the x and y coordinate axes, following equations 4, 5, and 6 shown below should be satisfied:

$$x21+x22+x23=0 \quad (4)$$

$$y21+y22+y23=0 \quad (5)$$

$$x21xy21+x22xy22+x23xy23=0 \quad (6)$$

Since the support apparatus 2 does not rotate upon receiving a load in the direction of the elastic axis, the sum of moment about the y-axis is zero. Accordingly, equation 4 is equilibrium of z-direction forces on the x-y plane rotated about the y-axis. Similarly, equation 5 shows equilibrium of z-direction forces on the x-y plane rotated about the x-axis. Equation 6 shows equilibrium of moment rotated about the x-axis or the y-axis.

According to the equations 4, 5 and 6, where the first support point 21 is positioned at (x21, y21, z21), the positions of the second and third support points 22 and 23 can be determined based on a hyperbola 35, whose center of point symmetry is located at a coordinate 34, which is at (−x21/2, −y21/2, A). The hyperbola 35 is expressed as in the following equation 7:

$$(x+x21/2)(y+y21/2) = -3 \times x21 \times y21/4 \quad (7)$$

The z-coordinate of the three drive unit points A can be any value.

Furthermore, when the x-coordinate of the first drive support point 21, in other words x21 is zero, the second and third support points 22 and 23 should be positioned on a line:

$$y=-y21/2 \quad (8)$$

with the center of point symmetry 34 being the midpoint therebetween. Similarly, when the y-coordinate of the first drive support point 21, in other words y21 is zero, the second and third support points 22 and 23 should be positioned on a line:

$$x=-x21/2 \quad (9)$$

with the center of point symmetry 34 being the midpoint therebetween.

Referring to FIG. 2, a support point 21 is positioned on an inertial axis 12 of the drive unit 1. The center of gravity 15 of drive unit 1 substantially coincides with the elastic center 19 of the elastic axes 16, 17 and 18 formed by support points 21, 22 and 23. Since the elastic axes 16, 17 and 18 coincide with the inertial axes 12, 13 and 14, equations 4–6 apply. Assuming that the x and y coordinate axes are the elastic axes 16 and 17, and that a first support point 21 is positioned at (x21, y21, z21), equations 8 and 9 further apply. Per equation 8 or 9, the other support points 22 and 23 should be positioned on a line that is perpendicular to the inertial axis 21 and is away from the center of gravity 15 by half the distance between the center of gravity 15 and the support point 21. On the line perpendicular to the inertial axis 21, the support points 22 and 23 are positioned such that the midpoint 45 between the support points 22 and 23 lies on the inertial axis 21. In this manner, the support points 22 and 23 can meet the arrangement conditions set forth in the equations 7–9.

As seen in FIG. 2, the support points 21, 22 and 23 are positioned so as to be on the same mounting plane. Thus, since the elastic center 19 and the center of gravity 15 coincide, when a linear force acts upon the drive unit 1, the line of action of the force will pass through the elastic center. Accordingly, the rigid body will undergo translational displacement in the same direction as the direction of the force. Meanwhile, when a couple of forces is applied to the drive unit 1, an angular displacement will result about an axis passing through the elastic center 19. This is because a vector sum of the reactionary force at each of the support points 21, 22 and 23 will have only a couple component. Therefore, the direction of the resultant vector will be the same as the direction of the axis of the angular displacement.

Therefore, this embodiment allows the directions of displacement of the drive unit 1 to be ascertained in advance. As a result, it is easy to dispose the drive unit such that the drive unit 1 does not interfere with surrounding members.

As described above, the support points 21, 22 and 23 form an isosceles triangle in this arrangement. Similarly, the support points 21, 22 and 23 can also be positioned on three vertices of a triangle that is larger than and similar to aforesaid isosceles triangle, as long as the center of the enlarged isosceles triangle is on the elastic center 19 of the elastic axes 16, 17 and 18 of the support points 21, 22 and 23.

Second Embodiment

Figure 5:
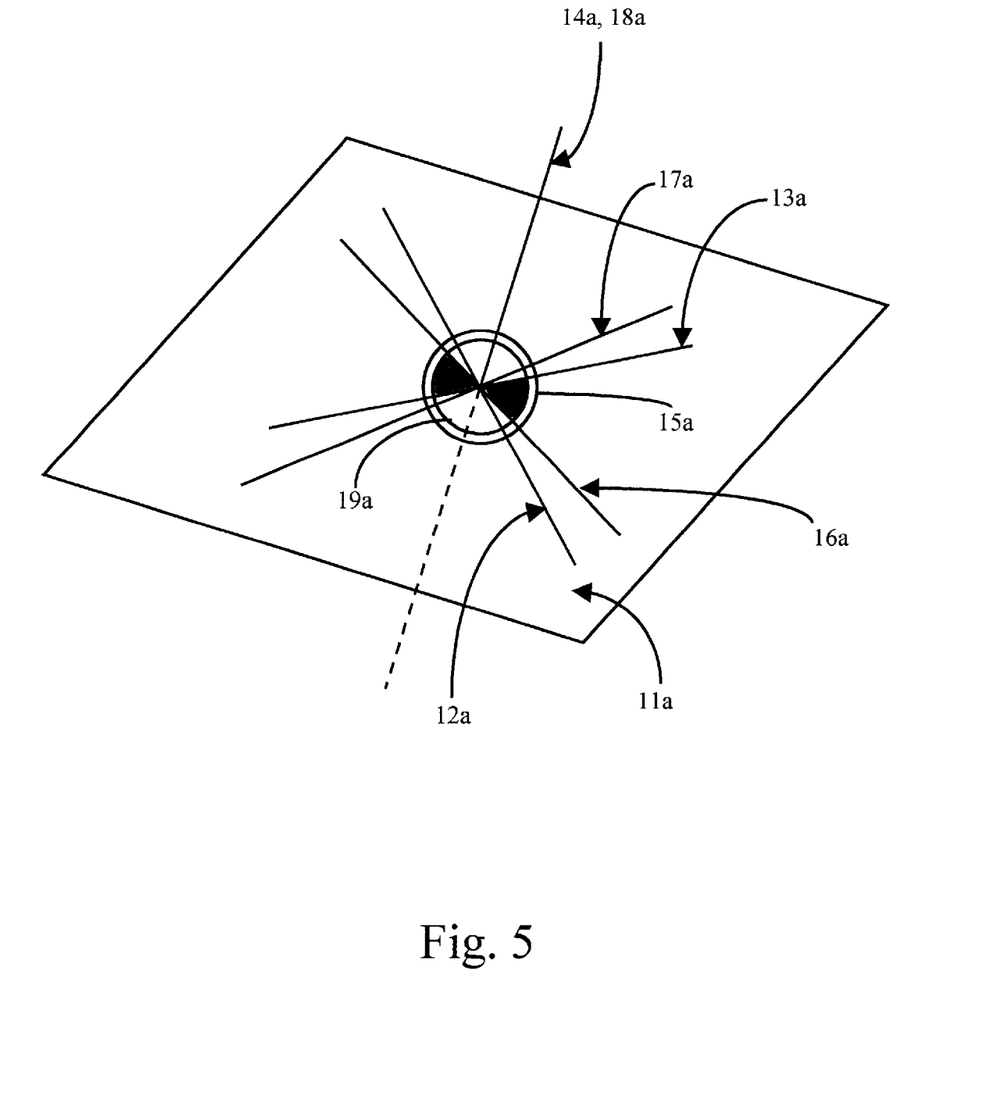
FIG. 5 is a perspective analytical diagram of the inertial axes, the elastic axes and the mounting plane for a modified vehicle drive unit and a modified support apparatus in accordance with a second embodiment of the present invention.
Figure 6:
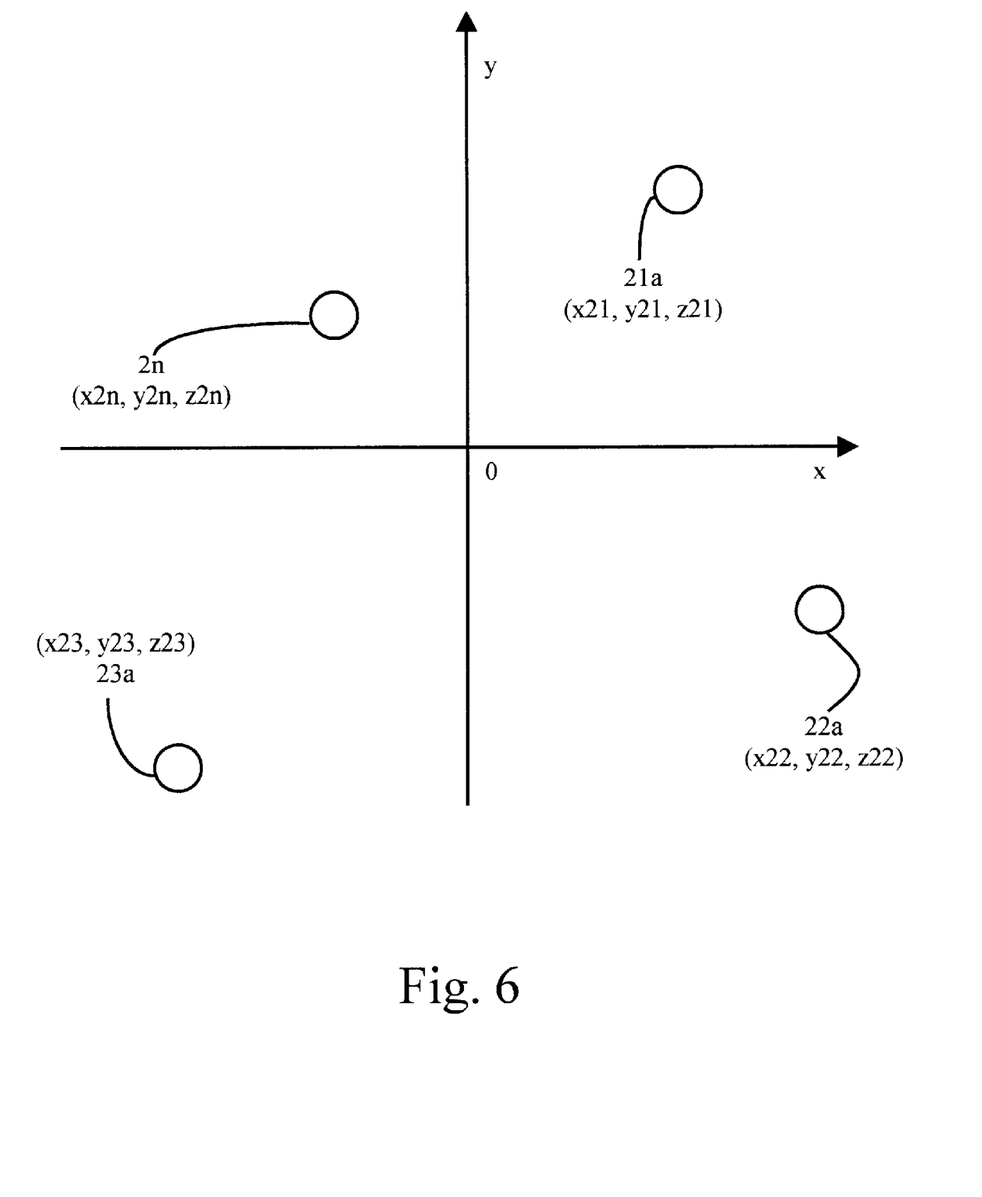
FIG. 6 is an analytical diagram of the support points as viewed along the vertical axis of the inertial axes and the elastic axes and arranged on the x-y plane to show the arrangement conditions of support points illustrated in FIG. 5 in accordance with the second embodiment of the present invention.

Referring now to FIGS. 5 and 6, a second embodiment of the present invention will now be explained. The second embodiment of the present invention is a modified version of the first embodiment discussed above. In view of the similarity between the first and second embodiments, the components of this second embodiment that have the same function as the components of the first embodiment are given the identical reference numerals followed by the letter "a". Thus, the components of the second embodiment that are similar to the components of the first embodiment, discussed above, will not be discussed in detail with reference to the second embodiment. Only those components and their operations of the second embodiment that are different in structure and function from that of the first embodiment will be explained with reference to the second embodiment.

FIG. 5 is an analytical view of the inertial principal axes 12a, 13a and 14a of the drive unit and the elastic principal axes 16a, 17a and 18a of the support apparatus in accordance with a second embodiment of the present invention. FIG. 6 is an analytical view of a coordinate system for plotting the support points 21a, 22b and 23c of a support apparatus for a vehicle drive unit. The drive unit and the support apparatus for FIG. 5 is substantially identical to FIGS. 1 and 2, except that the support points 21a, 22b and 23c of the support apparatus have been shifted so that the inertial principal axes 12a and 13a are skewed relative to the elastic principal axes 16a and 17a. Thus, the drive unit for this embodiment has the electric motor, the reduction gear and the differential unit supported by the support apparatus at three support points 21a, 22a and 23a.

Similar to the first embodiment, the support apparatus supports the drive unit using three identical types of elastic mounting members, such as insulators. Thus, the support apparatus supports the drive unit on support points 21a, 22a and 23a, which are on the same mounting plane 11a. Similar to FIG. 2, one of the support points is positioned on an inertial axis 12a of the drive unit. The center of gravity 15a of the drive unit substantially coincides with the intersection point or elastic center 19a of the elastic axes 16a, 17a and 18a formed by the support points.

The arrangement of the support points 21a, 22a and 23a will now be explained with reference to FIG. 5. In the second embodiment, the first and second inertial axes 12a and 13a of the drive unit and the first and second elastic axes 16a and 17a of the support apparatus are on the same mounting plane 11a. Also, the intersecting point 15a of three inertial axes 12a, 13a and 14a is the same as the intersecting point (elastic center) 19a of the three elastic axes 16a, 17a and 18a. In other words, in this embodiment, the center of gravity 15a of the drive unit is the same as the elastic center 19a of the support apparatus.

FIG. 6 is a top plan view of a x-y plane that shows the arrangement of the support points for the support apparatus supporting the drive unit. The first and second elastic axes 16a and 17a lie within the x and y coordinate axes. The support apparatus supports the drive unit via elastic mounting members. In this embodiment, the number of the support points is n, which is at least three (n≧3), as seen in FIG. 6.

Referring to each of the support points, a first support point 21 is at (x21, y21, z21). A second support point 22 is at (x22, y22, z22). A third support point 23 is at (x23, y23, z23). Similarly a nth support point 2n is at (x2n, y2n, z2n). Now, k21 is an elastic constant in the z-direction at the first support point 21. The z-direction is a vertical direction relative to the vehicle. Similarly, k22 is an elastic constant in the z-direction at the second support point, k23 is an elastic constant in the z-direction at the third support point, and k2n is an elastic constant in the z-direction at the nth support point. Now, if the first and second the elastic axes 16a and 17a that lie in the mounting plane 11 are x and y coordinate axes, then following equations 1, 2 and 3 should be satisfied:

$$k21 \times x21 + k22 \times x22 + k23 \times x23 + \ldots k2n \times x2n = 0 \quad (1)$$

$$k21 \times y21 + k22 \times y22 + k23 \times y23 + \ldots k2n \times y2n = 0 \quad (2)$$

$$k21 \times x21 \times y21 + k22 \times x22 \times y22 + k23 \times x23 \times y23 + \ldots k2n \times x2n \times y2n = 0 \quad (3)$$

Since the support apparatus does not rotate upon receiving a load in the direction of an elastic axis, the sum of moment about y-axis is zero. Accordingly, equation 1 shows equilibrium of z-direction forces on the x-y plane rotated about the y-axis. Similarly, equation 2 shows equilibrium of z-direction forces on the x-y plane rotated about the x-axis. Equation 3 shows equilibrium of moment rotated about the x-axis or the y-axis.

Therefore, in the second embodiment of the present invention as seen in FIG. 5, two of the inertial axes of the drive unit and two of the elastic axes of the support apparatus are on the mounting plane 11a, which is defined by the forementioned n supporting points. Also, the support points 21a, 22a and 23a are arranged so that the center of gravity 15a substantially coincides with the origin of the x-y coordinates. In other words, the intersection point or center of gravity 15a of the inertial axes 21a, 22a and 23a of the drive unit coincides with the elastic center 19a, which is the intersection point of the elastic axes 16a, 17a and 18a formed by the support points 21a, 22a and 23a.

Thus, when a linear force acts upon the drive unit of this embodiment, the line of action of the force will pass through the elastic center 19a. Accordingly, the drive unit will undergo a translational displacement but not an angular displacement. Meanwhile, when a couple of forces is applied to the drive unit, an angular displacement will result about an axis passing through the elastic center 19a. This is because a vector sum of reactionary forces at each of the support points 21a, 22a and 23a will have only a couple component.

In other words, moments acting on the drive unit can be resolved into a component parallel to the mounting plane 11a and a component normal to the plane 11a. Accordingly, the rigidity of support apparatus can be adjusted differently for different directions. More specifically, the rigidity in directions within the mounting plane 11a can be set at a low value to have a low translational rigidity of the support apparatus. Conversely, the rigidity in a direction perpendicular to the mounting plane 11a can be set at a high value to have a high rotational rigidity of the support apparatus. Furthermore, since the center of gravity of the drive unit coincides with the elastic center of the elastic axes of the support apparatus, design of translational characteristic values can be simplified.

Third Embodiment

Figure 7:
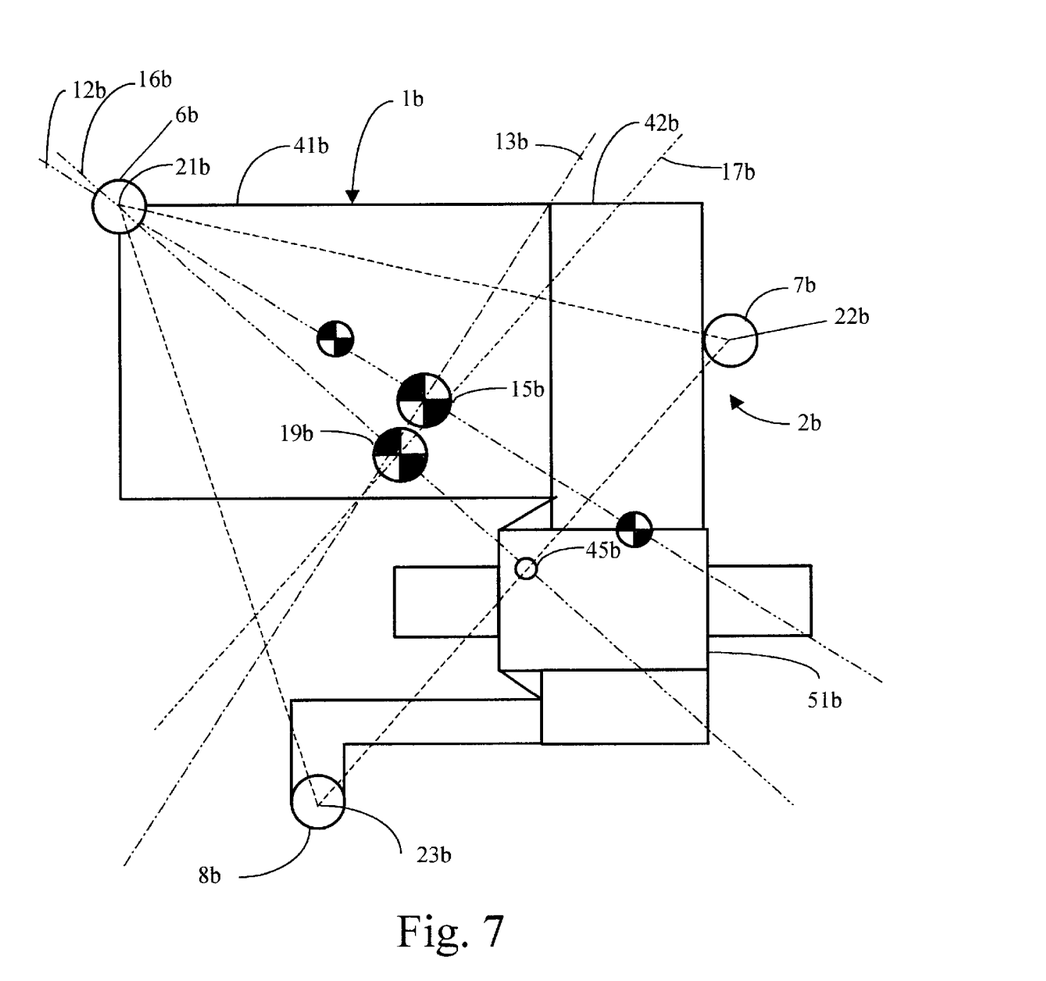
FIG. 7 is a schematic top plan elevational view illustrating a vehicle drive unit being supported at three support points by a support apparatus in accordance with a third embodiment of the present invention.
Figure 8:
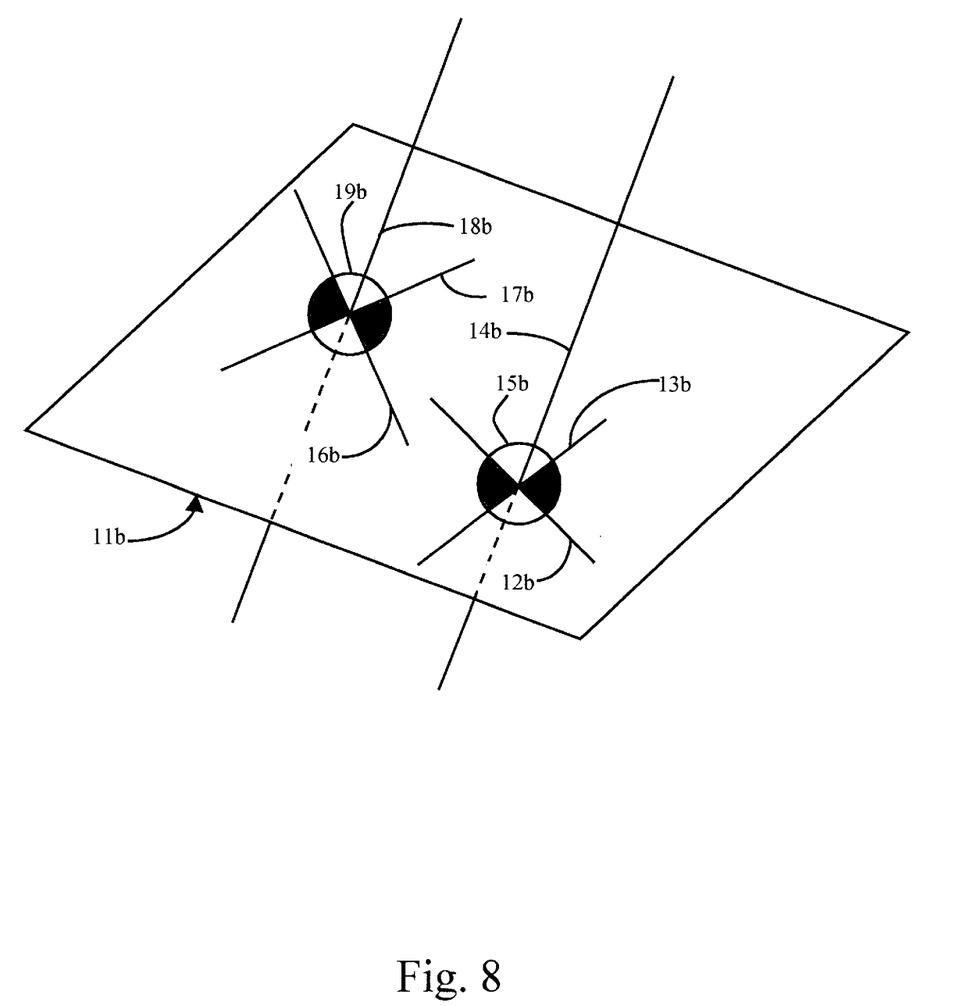
FIG. 8 is a perspective analytical diagram of the inertial axes, the elastic axes and the mounting plane for the vehicle drive unit and the support apparatus illustrated in FIG. 7 in accordance with the third embodiment of the present invention.

Referring now to FIGS. 7 and 8, a third embodiment of the present invention will now be explained. The third embodiment of the present invention is a modified version of the first embodiment discussed above. In view of the similarity between the first and third embodiments, the components of this third embodiment that have the same function as the components of the first embodiment are given the identical reference numerals followed by the letter "b". Thus, the components of the third embodiment that are similar to the components of the first embodiment, discussed above, will not be discussed in detail with reference to the third embodiment. Only those components and their operations of the third embodiment that are different in structure and function from that of the first embodiment will be explained with reference to the third embodiment.

FIG. 7 is a schematic view of a vehicle drive unit 1b illustrated with the drive unit 1b being supported by a support apparatus 2b to a floor panel (not shown) of a vehicle body at three elastic suspension points in accordance with a third embodiment of the present invention. As seen in FIG. 8, the support apparatus 2b supports a drive unit 1b on suspension or support points 21b, 22b and 23b, which lie in the same mounting plane 11b. The drive unit 1b is supported on vehicle support members coupled to a floor panel of the vehicle similar to the first embodiment. Elastic mounting members 6b, 7b and 8b form the support points 21b, 22b and 23b. Examples of the elastic mounting members 6b, 7b and 8b include rubber washers, springs, insulators or any other known elastic mounting device that can be used to carry out the present invention.

Referring to FIG. 7, the drive unit 1b includes an electric motor 41b, a reduction gear 42b and a differential unit 51b. Since drive units are well known, further explanation of the drive unit 1b will be omitted herein. Accordingly, the drive unit 1b will only be briefly described herein such that one of ordinary skill in the art can understand the construction of the drive unit 1b to be employed in the present invention from this description. The drive unit 1b has an inertial coordinate system defined by three orthogonally arranged inertial principal axes 12b, 13b and 14b that intersect at a single point 15b. The single point 15b is the inertial center of the drive unit 1b. The drive unit 1b has its overall center of gravity substantially coinciding with the inertial center at point 15b. Each of the elastic mounting members 6b, 7b and 8b has elastic centers located at support points 21b, 22b and 23b. The elastic mounting members 6b, 7b and 8b define an entire elastic support system for the drive unit 1b. This elastic support system of the mounting members 6b, 7b and 8b has an elastic coordinate system with three orthogonally arranged elastic principal axes 16b, 17b and 18b that intersect at a single point (elastic center) 19b. This single point 19b is the overall elastic center of the elastic support system defined by the elastic mounting members 6b, 7b and 8b. Inertial principal axes 12b and 13b of the drive unit 1b and elastic principal axes 16b and 17b of the support apparatus 2b are on the same mounting plane 1b.

FIG. 8 is an analytical view of the inertial axes 12b, 13b and 14b of the drive unit 1b and the elastic axes 16b, 17b and 18b of the support apparatus 2b. The arrangement of the support points 21b, 22b and 23b shown in FIG. 7 will now be explained with reference to FIG. 8. The support apparatus 2b supports the drive unit 1 at a plurality of support points 21b, 22b and 23b which is on the same mounting plane 11b. While the number of the support points is illustrated as three, it will be apparent to those skilled in the art from this disclosure that more than three support points can be used to carry out this invention. In accordance with the support apparatus 2b of this embodiment, the drive unit 1b is supported such that two of the three inertial axes 12b, 13b and 14b of the drive unit 1b are contained within the mounting plane 11b. Thus, as shown in FIG. 8, the center of gravity 15b of the drive unit 1b is inevitably positioned on the single mounting plane 11b. The vertical positions of the support points 21b, 22b and 23b can be any vertical location so long as they are in the same horizontal plane.

On the other hand, the support apparatus 2b has three elastic axes 16b, 17b and 18b defined by the plurality of elastic mounting members 6b, 7b and 8b. Since all of the support points 21b, 22b and 23b are on the same mounting plane 11b, two of the elastic axes 16b and 17b also lie on the same mounting plane 11b.

Accordingly, the elastic center 19b and the center of gravity 15b are both substantially located on the mounting plane 11b. Since the drive unit 1b should be displaced in a translational direction upon receiving a linear force, and in angular direction upon receiving a couple of forces, any combination of linear force and a couple of forces can be resolved into translational and angular displacements. Therefore, moments acting on the drive unit 1b can be resolved into a component within the mounting plane 11b and a component normal to the mounting plane 11b.

Accordingly, in designing the elastic mounting members 6b, 7b and 8b that will bear the forces acting on the drive unit 1b, the rigidity in a direction parallel to the mounting plane 11b and the rigidity in the direction normal to the plane can be separated. More specifically, the rigidity in directions within the mounting plane 11b can be set at a low value to have a low translational rigidity in the support apparatus 2b. Conversely, the rigidity in a direction perpendicular to the mounting plane 11b can be set at a high value to have a high rotational rigidity in the support apparatus 2b. Accordingly, it is possible to set rotational characteristic values such as rotational rigidity at a high value.

Fourth Embodiment

Figure 9:
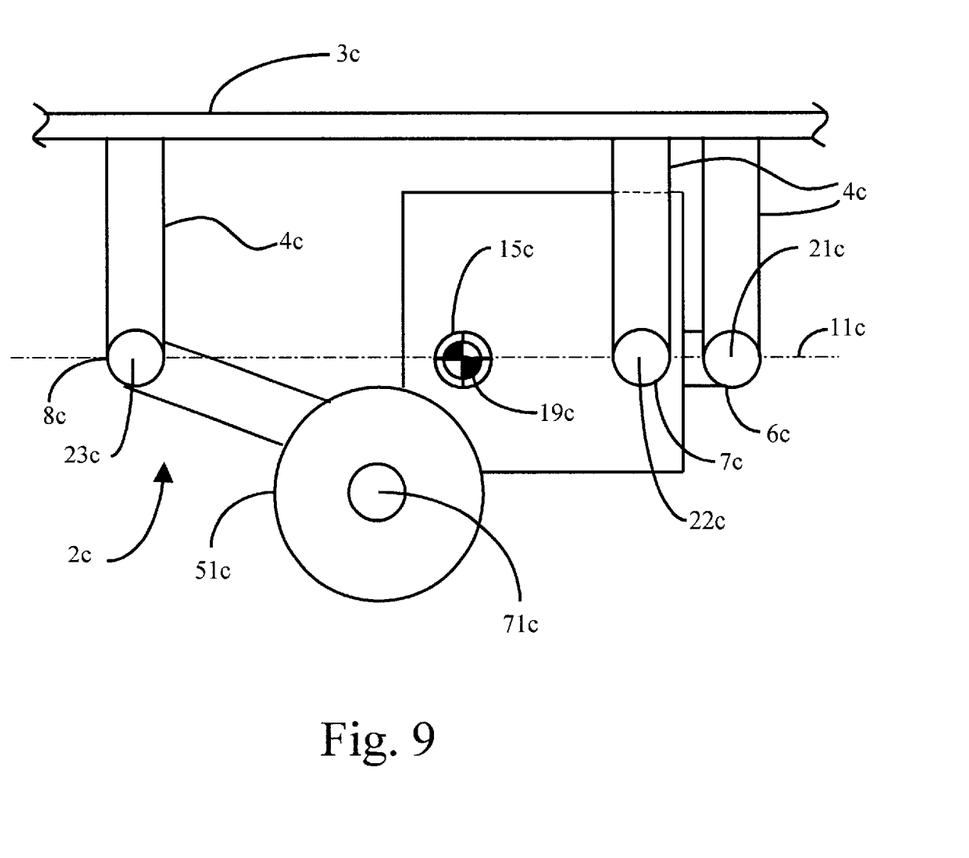
FIG. 9 is a schematic side elevational view illustrating a vehicle drive unit being supported at three support points by a support apparatus in accordance with a fourth embodiment of the present invention.
Figure 10:
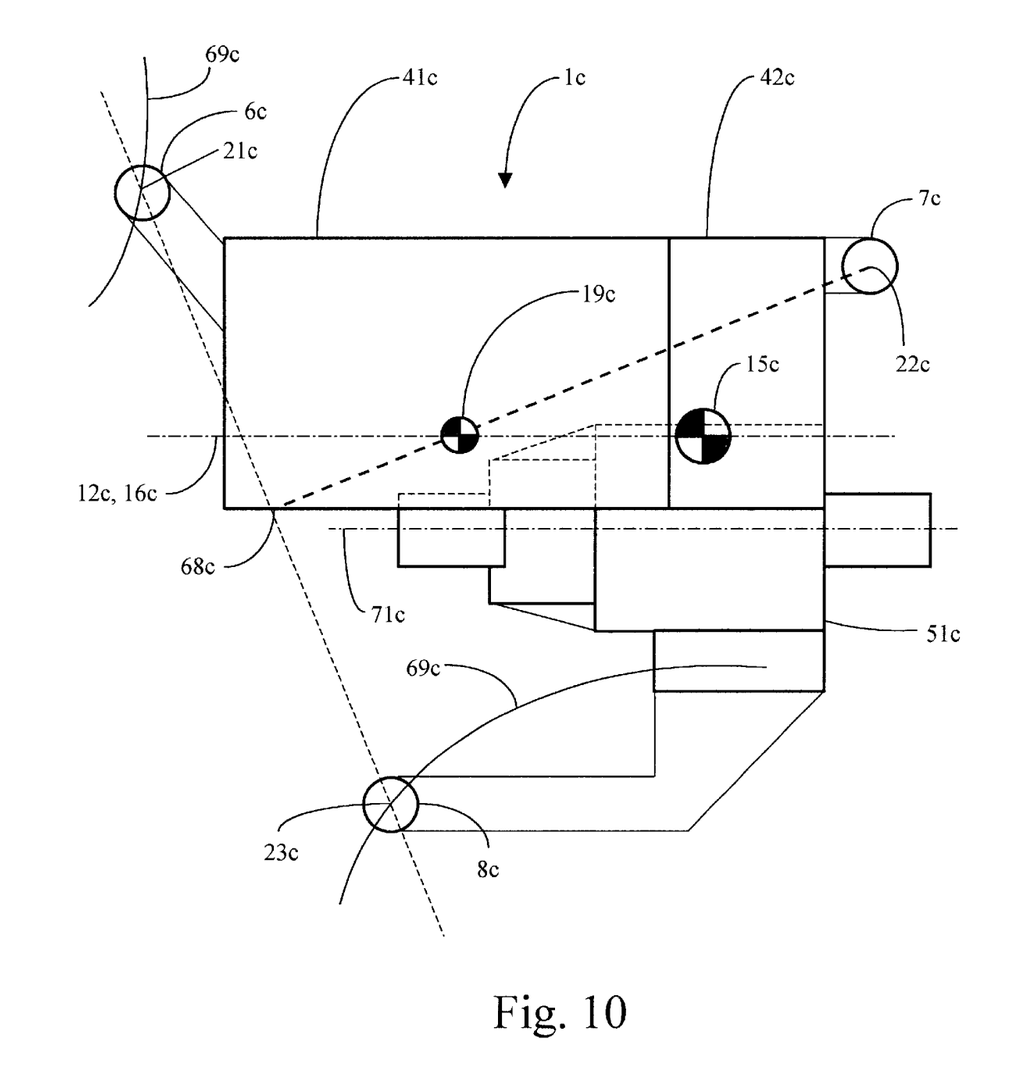
FIG. 10 is a schematic top plan view illustrating the vehicle drive unit being supported at three support points by the support apparatus illustrated in FIG. 9 in accordance with the fourth embodiment of the present invention.
Figure 11:
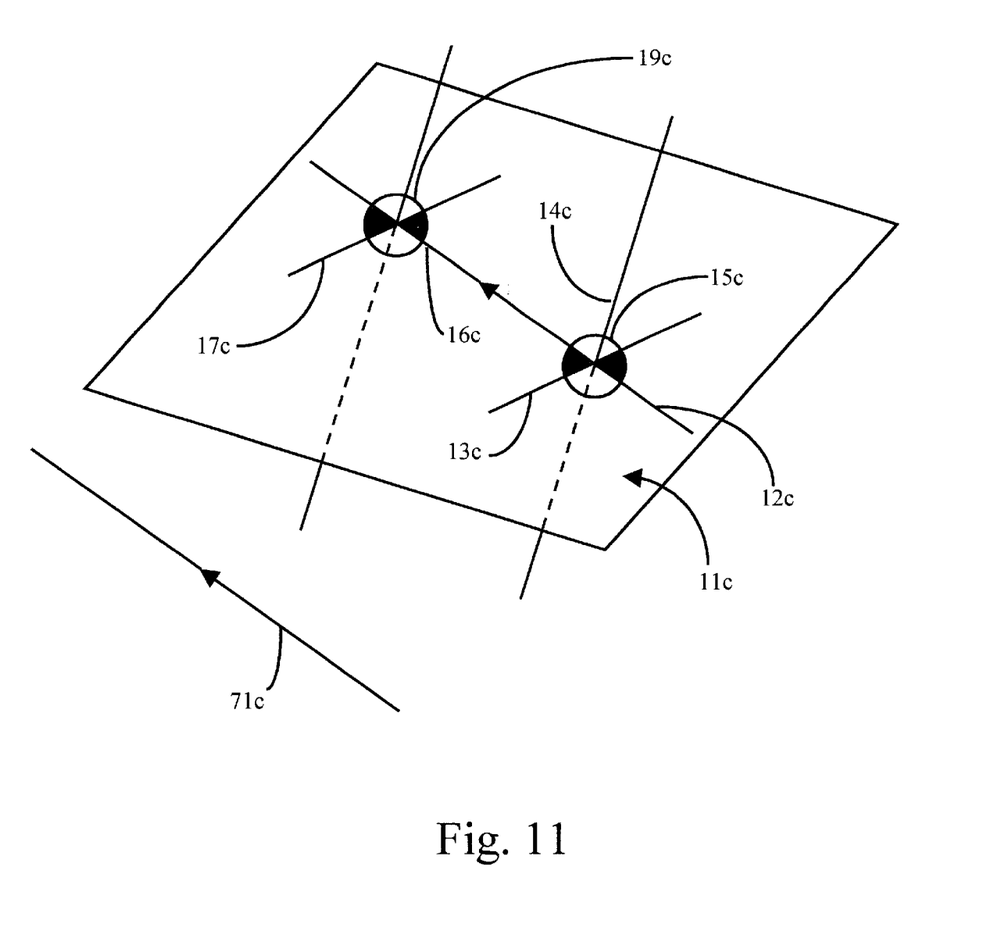
FIG. 11 is a perspective analytical diagram of the inertial axes, the elastic axes and the mounting plane for the vehicle drive unit and the support apparatus illustrated in FIGS. 9 and 10 in accordance with the fourth embodiment of the present invention.

Referring now to FIGS. 9–11, a fourth embodiment of the present invention will now be explained. The fourth embodiment of the present invention is a modified version of the first embodiment discussed above. In view of the similarity between the first and fourth embodiments, the components of this fourth embodiment that have the same function as the components of the first embodiment are given the identical reference numerals followed by the letter "c". Thus, the components of the fourth embodiment that are similar to the components of the first embodiment, discussed above, will not be discussed in detail with reference to the fourth embodiment. Only those components and their operations of the fourth embodiment that are different in structure and function from that of the first embodiment will be explained with reference to the fourth embodiment.

FIGS. 9 and 10 are schematic views of a support apparatus 2c supporting a drive unit 1c having an electric motor 41c, a reduction gear 42c and a differential unit 51c in accordance with the fourth embodiment of the present invention. As seen in FIG. 9, the support apparatus 2c supports a supporting a drive unit 1c on suspension or support points 21c, 22c and 23c, which lie in the same mounting plane 1c. The drive unit 1c is supported on a plurality of vehicle support members 4c coupled to the floor panel 3c of the vehicle. The vehicle support members 4c can be any type of framing support. For example, the vehicle support members 4c can be cross members formed with or on the floor panel 3c of the vehicle or a sub-frame that is coupled to the floor panel 3c of the vehicle. A first inertial principal axis 12c of the drive unit 1c is parallel to a drive shaft axis 71c.

As seen in FIG. 11, the support points 21c, 22c and 23c are positioned so as to be on the same mounting plane 11c. The three support points 21c, 22c and 23c support the drive unit 1c using the identical types of elastic member 6c, 7c and 8c.

The arrangement of the support points will now be explained with reference to FIG. 11. In this embodiment, the first inertial principal axis 12c of the drive unit 1c is oriented so as to be parallel to the drive shaft axis 71c. Further, support points 21c, 22c and 23c are disposed such that the first inertial principal axis 12c coincides with first elastic principal axis 16c of the support points. The number of the support points is n, which is at least three (n≧3). In other words, the arrangement shown in FIGS. 10 and 11 is similar to the one in FIGS. 7 and 8, except that the first inertial principal axis 12c on the mounting plane 11c is parallel to the drive axis 71c, and that the first inertial principal axis 12c substantially coincides with the first elastic principal axis 16c on the mounting plane 11c.

Where x and y-axes are the first and second elastic principal axes 16c and 17c of the support apparatus 2c, the aforesaid equations 4–6 should be satisfied in this embodiment. Further, by positioning a first support point at (x21, y21, z21), positions of the other two support points can be determined based on the hyperbola 35, which is expressed as in equation 7. In other words, the positions of the other two support points can be determined using an isosceles triangle in the same manner as in the first embodiment.

Referring to FIG. 11, the first inertial principal axis 12c and the second elastic principal axis 16c are parallel to the drive shaft 71c, while the second inertial principal axis 13c and the second elastic principal axis 17c are perpendicular to the drive shaft 71c. The inertial principal axes 12c, 13c and 14c all intersect with each other at an intersection point (center of gravity) 15c. The elastic principal axes 16c, 17c and 18c all intersect with each other at an intersection point (elastic center) 19c. To arrange three support points, a first support point 21c is first positioned. Then, similarly as in FIG. 4, a center of point symmetry coordinate 68c and a hyperbola 69c are determined so that first elastic principal axis 16c of the support points substantially coincides with the first inertial principal axis 12c. The other two support points 22c and 23c should be arranged on hyperbola 69c such that the center 68c is the midpoint therebetween.

As described above, the support points 21c, 22c and 23c form an isosceles triangle in this arrangement. Similarly, the support points 21c, 22c and 23c can also be positioned on three vertices of a triangle that is larger than and similar to the aforesaid isosceles triangle, as long as the center of the enlarged isosceles triangle is on the intersection point 19c of the elastic principal axes 16c, 17c and 18c of the support points.

As seen in FIG. 9, the support points 21c, 22c and 23c are positioned so as to be on the same mounting plane 11c. In this embodiment, the drive unit 1c undergoes an angular displacement upon receiving moment from rotation of the drive shaft. The rotational axis of the angular displacement is the elastic principal axis and the inertial principal axis which are on the mounting plate and are parallel to the drive shaft. Hence, the direction of angular displacement can be ascertained in advance.

Besides, by making the inertial principal axis and elastic principal axis parallel to the drive shaft, the moment input caused by rotation of the drive shaft can easily be separated. Therefore, moments from the rotation of the drive shaft acting on the drive unit 1c can be resolved into a component within the mounting plane and a component normal to the plane. Accordingly, by setting the rigidity of support apparatus 2c at a high value, it is possible to reduce the effect of variation in rotational torque of the drive shaft at the time of start-up or acceleration of the vehicle.

Besides, by making the inertial principal axis and elastic principal axis parallel to the drive shaft, the moment input caused by rotation of the drive shaft can easily be separated. Therefore, moments from the rotation of the drive shaft acting on the drive unit 1c can be resolved into a component within the mounting plane and a component normal to the plane. Accordingly, by setting the rigidity of support apparatus 2c at a high value, it is possible to reduce the effect of variation in rotational torque of the drive shaft at the time of start-up or acceleration of the vehicle.

As illustrated by the preceding explanations of the embodiments, the present invention can provide a support apparatus for a drive unit which arranges support points based on the inertial axes of the drive unit and the elastic axes of the support apparatus. Especially, the support apparatus of the present invention facilitates separation of forces in translational direction and forces in rotational direction. Accordingly, the support apparatus can provide low rigidity in the translation direction, which reduces vibrations of the drive unit. At the same time, the support apparatus can provide high rigidity in the rotational direction in a low displacement region, which reduces vibrations due to reactionary force to driving force.

As a result, the present invention reduces translational resonance that occurs due to torque variations. Further, the present invention allows configuration of the rotational characteristic values at a high value in order to reduce jerking vibrations that occur when the vehicle starts moving.

The terms of degree such as "substantially", "about" and "approximately" as used herein mean a reasonable amount of deviation of the modified term such that the end result is not significantly changed. These terms should be construed as including a deviation of the modified term if this would not negate the meaning of the word it modifies. Moreover, the expressions "within the same plane" and "coincide," as used herein are not meant to be heeded with exact precision. Typically, when the present invention is applied to an actual hybrid car or electric car, the drive unit support portions elastically support the drive unit using an insulator. Consequently, dimensional errors result from deflection of the insulators. Accordingly, the expressions "within the same plane" and "coincide," should be construed as including a deviation of about ±20 mm in view of the above mentioned effects of deflections and other possible dimensional errors due to imprecise manufacturing.

This application claims priority to Japanese Patent Application No. H11-256611. The entire disclosure of Japanese Patent Application No. H11-256611 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A support apparatus for a vehicle drive unit having a center of gravity and an inertial coordinate system defined by three inertial principal axes orthogonally intersecting at a single point that coincides with the center of gravity, said support apparatus comprising:

a vehicle support member; and at least three elastic mounting members coupled to said vehicle support member with supporting members lying within a mounting plane, said elastic mounting members defining an entire elastic support system having an elastic coordinate system with three elastic principal axes orthogonally intersecting at a single point that coincides with an overall elastic center of said elastic mounting members, said elastic mounting members further being dimensioned and arranged on said vehicle support member so that said elastic mounting members are adapted to support the drive unit such that two of the inertial principal axes of the drive unit are within said mounting plane of said elastic mounting members.

2. A support apparatus according to claim 1, wherein said elastic mounting members are further dimensioned and arranged on said vehicle support member so that said elastic mounting members are adapted to support the drive unit such that the center of gravity of the drive unit substantially coincides with said elastic center of said elastic support system.

3. A support apparatus according to claim 2, wherein said elastic mounting members are further dimensioned and arranged on said vehicle support member so that said elastic mounting members are adapted to support the drive unit such that the two inertial principal axes existing in said mounting plane substantially coincide with two of said elastic principal axes of said elastic support system.

4. A support apparatus according to claim 1, wherein said elastic mounting members are further dimensioned and arranged on said vehicle support member so that said elastic mounting members are adapted to support the drive unit such that one of the inertial principal axes of the drive unit contained within said mounting plane is substantially parallel with a drive shaft.

5. A support apparatus according to claim 4, wherein said elastic mounting members are further dimensioned and arranged on said vehicle support member so that said elastic mounting members are adapted to support the drive unit such that one of the inertial principal axes of the drive unit contained within said mounting plane substantially coincides with one of said elastic principal axes of said elastic support system contained within said mounting plane and is substantially parallel with a drive shaft.

6. A support apparatus for a vehicle drive unit having a center of gravity and an inertial coordinate system defined by three inertial principal axes orthogonally intersecting at a single point that coincides with the center of gravity, said support apparatus comprising:

a vehicle support means for supporting the drive unit; and elastic mounting means for elastically coupling said vehicle support means to the drive unit, said elastic mounting means having an elastic coordinate system with three elastic principal axes orthogonally intersecting at a single point forming an elastic center of said elastic mounting means and two of said elastic principal axes lying within a mounting plane of said elastic mounting means, said elastic mounting means further being dimensioned and arranged on said vehicle support means so that said elastic mounting means are adapted to support two of the inertial principal axes of the drive unit within said mounting plane of said elastic mounting means.

7. A support apparatus according to claim 6, wherein said elastic mounting means are further dimensioned and arranged on said vehicle support means so that said elastic mounting means are adapted to support the drive unit such that the center of gravity of the drive unit substantially coincides with said elastic center of said elastic support system.

8. A support apparatus according to claim 7, wherein said elastic mounting means are further dimensioned and arranged on said vehicle support means so that said elastic mounting means are adapted to support the drive unit such that the two inertial principal axes existing in said mounting plane substantially coincide with two of said elastic principal axes of said elastic support system.

9. A support apparatus according to claim 6, wherein said elastic mounting means are further dimensioned and arranged on said vehicle support means so that said elastic mounting means are adapted to support the drive unit such that one of the inertial principal axes of the drive unit contained within said mounting plane is substantially parallel with a drive shaft.

10. A support apparatus according to claim 9, wherein said elastic mounting means are further dimensioned and arranged on said vehicle support means so that said elastic mounting means are adapted to support the drive unit such that one of the inertial principal axes of the drive unit contained within said mounting plane substantially coincides with one of said elastic principal axes of said elastic support system contained within said mounting plane and is substantially parallel with a drive shaft.

* * * * *